United States Patent [19]

Ward

[11] 4,225,360
[45] Sep. 30, 1980

[54] TREATMENT OF GYPSUM PLASTER

[75] Inventor: Arthur G. T. Ward, Wilford, England

[73] Assignee: BPB Industries Limited, London, England

[21] Appl. No.: 974,010

[22] Filed: Dec. 28, 1978

Related U.S. Application Data

[63] Continuation-in-part of Ser. No. 819,149, Jul. 26, 1977, abandoned.

[51] Int. Cl.² .............................................. C04B 11/00
[52] U.S. Cl. .................................... 106/109; 106/110
[58] Field of Search ................................ 106/109, 110

[56] References Cited
U.S. PATENT DOCUMENTS 2,285,098  6/1942  Schoch et al. ...................... 106/109

Primary Examiner—James Poer
Attorney, Agent, or Firm—Birch, Stewart, Kolasch & Birch

[57] ABSTRACT

The present invention is directed to the treatment of gypsum plaster prepared from gypsum rock having a substantial content of soluble salts wherein the gypsum plaster is rendered more suitable for manufacturing processes such as the production of gypsum board by rapid and intimate mixing with a flow of cold water followed by rapid separation of the bulk of the water on a continuous filtration apparatus. A preferred form of an apparatus is a suction belt filter and it is preferred that the residence time of the wet plaster on the filter does not exceed 15 seconds. The total time elapsing between initial contact with water and recovery from the continuous filter preferably does not exceed 30 seconds. The salt content of the plaster is considerably reduced by this treatment without significant hydration occurring and the treatment is economic because cold water (up to 40° C.) and no retarder or other additives are preferably employed.

9 Claims, 1 Drawing Figure

TREATMENT OF GYPSUM PLASTER

CROSS REFERENCE TO RELATED APPLICATION

The present application is a continuation-in-part of co-pending application Ser. No. 819,149 filed July 26, 1977, now abandoned.

BACKGROUND OF THE INVENTION

1. Field of the Invention

This invention relates to the treatment of gypsum plaster, more especially for the purposes of utilization in the production of set gypsum products, more particularly plaster or gypsum board.

2. Description of the Prior Art

Gypsum rock, as it occurs naturally, has a variable content of soluble salts, notably including chloride, sulphate, magnesium and sodium ions. This salt content is carried in over the plaster produced by calcination of such rock and can give rise to problems in the manufacture of gypsum board and like products.

For this reason many deposits of gypsum cannot be used to provide the plaster for gypsum board, although attempts have been made to leach the salt out of the mined gypsum, for example by storing the gypsum in lagoons prior to calcination. This, however, incurs the cost of drying prior to calcination.

While gypsum, calcium sulphate dihydrate, can be immersed in water for prolonged periods without significant chemical change, the cementitious, dehydrated forms, herein referred to as "plaster," and more especially the hemihydrate, react with water below their respective transition temperatures to re-form the hydrated compound. Since a substantially rehydrated material will not set to form a cast product, or will yield only a set product of very low strength, it is clear that the washing of gypsum plaster in its dehydrated forms with water faces a fundamental problem of avoiding unacceptable hydration during the washing process.

One way of avoiding hydration is to conduct the washing operation above the transition point, as in the production of so-called autoclave plaster or in the formation of by-product gypsum in phosphoric acid production, where the calcium sulphate is precipitated in hemihydrate form. However, the cost of heating the large volumes of water necessary for washing the plaster employed in large-scale manufacture, for example of plasterboard, makes this solution of the problem uneconomic.

British Pat. Nos. 1 127 397 (Bird Machine Company) and 1 190 014 (Imperial Chemical Industries) are examples of the use of continuous hot centrifigation to separate liquid from suspensions of calcium sulphate hemihydrate without setting or hydration, although in either case in this done subsequent to a washing or leaching operation. In the first patent a slurry of hemihydrate is discharged from an autoclave into the centrifuge at about the atmospheric boiling point of water and the solids discharge compartment of the centrifuge casing is also maintained above the inversion temperature. In the latter patent a similar slurry is dewatered in a centrifuge in which all the surfaces on which hemihydrate is liable to be deposited are maintained at a temperature of at least 100° C.

Schoch et al in U.S. Pat. No. 2 285 098 discloses that although below the invention temperature, hydration will occur, it may not be sufficiently rapid to prevent successful filtration and washing of the hemihydrate. He teaches, however, that the temperature should not fall to any extent below 80° C. in order to give ample time for these operations.

Hydration can also be delayed by the addition of a setting retarder, so allowing more time for the washing process without an undesirable degree of hydration, but not only is the use of a retarder more costly in itself, but also has the disadvantage that the setting of the final cast product is correspondingly affected. This is particularly undesirable in continuous production processes, such as plasterboard manufacture, where rapid setting is desirable in order to shorten the length of the production lines. Accelerators can be used to increase the setting rate, but their use to offset a decrease in setting rate brought about by a setting retarder adds yet another undesirable element of cost.

SUMMARY AND OBJECTS OF THE INVENTION

It has now been found that when calcined gypsum plaster, in its conventional dry particulate form, is added to water it rapidly releases soluble salts into the water and that it is possible to secure this release and to separate off the bulk of the contaminated water by rapid handling before an unacceptable degree of hydration occurs. This can provide a method whereby salt can be economically leached from the plaster being supplied to a continuous manufacturing process, without undue hydration of the plaster prior to the time at which hydration is required in the manufacture of a set product.

According to the invention, a continuous supply of salt-bearing gypsum plaster is rapidly and intimately mixed with a flow of relatively cold water and, more especially at a temperature in the range 0 to 40° C., and after a time (hereinafter called the 'residence time') too short for unacceptable hydration of the plaster to occur, a substantial proportion of the water containing dissolved salt is continuously filtered from the plaster and the damp or wet plaster is conveyed to the further stages of the manufacturing process. By adjustment of the degree of separation of the water from the plaster it can be contrived that the damp plaster contains just that proportion of water that is required in a gauged plaster for the manufacturing purposes involved. Alternatively, a higher degree of separation may be achieved, with consequential removal of a higher proportion of the salt content, and the desired gauging water level made up with pure water before utilization of the plaster.

The invention also provides an apparatus for the continuous removal of salt from gypsum plaster, which comprises a supply of dry salt-bearing gypsum plaster, a supply of water, a mixing zone including a continuous stream of the water, and continuous filtration means for separating a substantial proportion of the water from the mixture, the filter being in such close communication with the mixing zone that the residence time between mixing and separation of water does not permit undue hydration of the plaster.

One preferred construction of the mixing zone has a vortical form, in which the water is caused to flow down the internal wall surface of an inverted hollow cone while plaster is fed onto an upright smaller cone, the falling plaster being thereby deflected and distributed over the internal surface of the latter. By this means the plaster can be instantly and intimately mixed with the water, and the vortical mixer can be mounted over the continuous filter.

Other forms of continuous mixer with low residence times can be used, for example, a rotary mixer in which the plaster falls onto the upper, preferably conical, surface of a high speed rotor when it meets a continuous supply of water and is discharged centrifugally as a slurry.

The ratio by weight of washing water to plaster can be varied over a wide range, depending on the relative capacities of the mixer and filter, ratios in the range 1:1 to 5:1 being at present preferred.

More specifically, in accordance with the preferred embodiment of this invention, the continuous filtration apparatus employed comprises a continuous belt filter, such as a suction belt filter, operating at a sufficient speed to achieve the desired low residence times.

The continuous belt filter avoids certain disadvantages in the use of other forms of separators such as a continuous centrifuge, which entail a distribution of residence times of the solid plaster particles in the separator. Such variable residence times can give rise to setting and hydration problems. In the present embodiment the basic design of the horizontal belt filter ensures a virtual plug-flow of the plaster particles during the solid/liquid separation process. Therefore, the residence times of all the solid particles is virtually the same and can be adjusted to any desired preset level.

The used water can be recycled to treat further plaster, with provision being made for a supply of pure feed or make-up water and for withdrawal as waste effluent of a proportion of the used water, so as to prevent the build-up of salt concentration in the water to an undesirable level.

The water employed is preferably cold, that is, in the range 0° to 40° C. and especially 0° to 30° C. and usually at ambient temperature, in which case a residence time of less than 30 seconds is desirable and 10–15 seconds is a typical range. If hot water is employed, the residence time can be longer, but this advantage is offset by the additional cost of heating the water. Similarly, the permissible residence time can be lengthened by adding a setting retarder but again there will be increased cost and inconvenience.

BRIEF DESCRIPTION OF THE DRAWING

The invention will be further described, by way of example, with reference to the accompanying drawing in which.

DETAILED DESCRIPTION OF THE INVENTION

Figure 1:
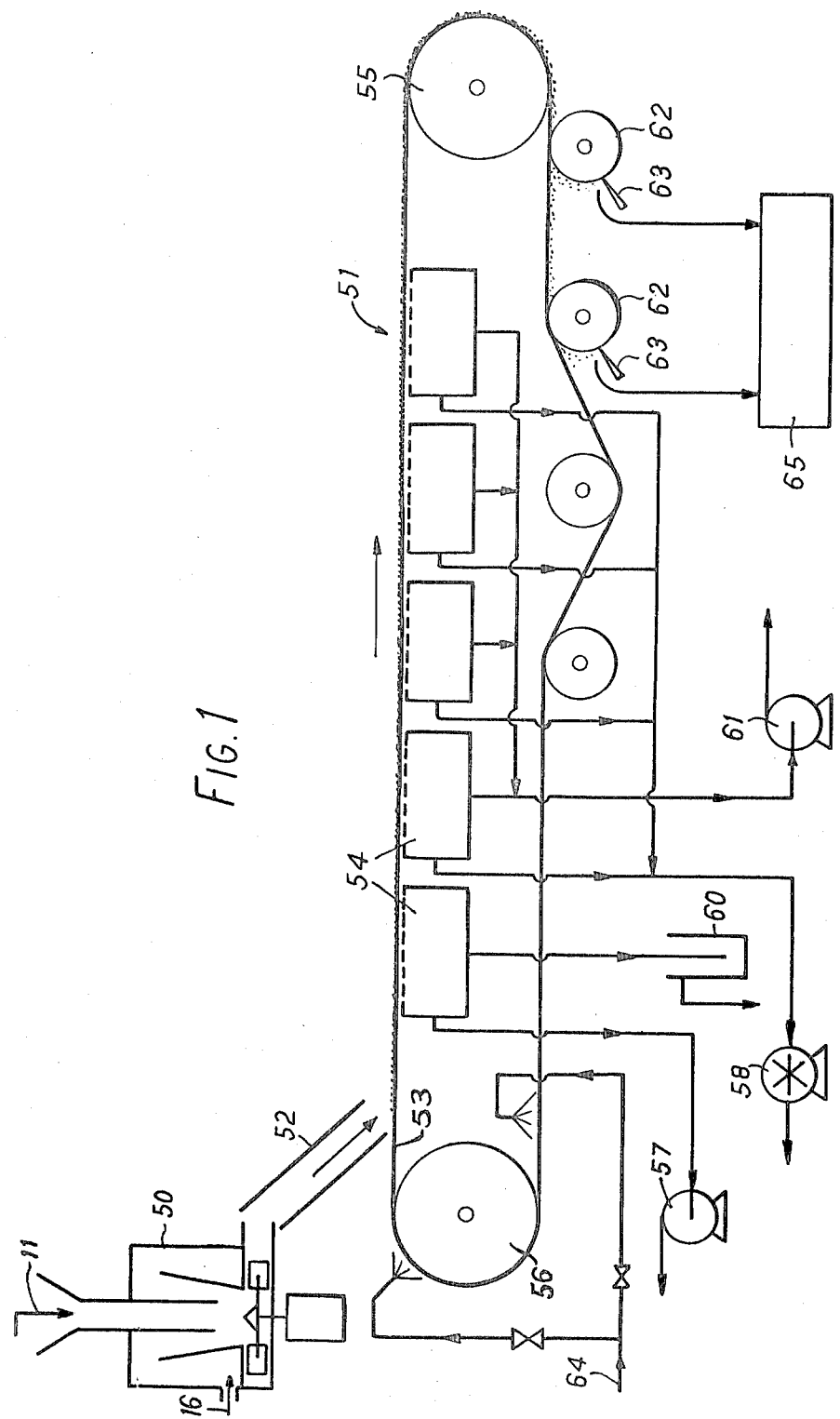
FIG. 1 is a schematic diagram of one example of apparatus for carrying out the invention.

The apparatus shown in the drawings is arranged to discharge gauged plaster to a gypsum board machine, which may be of a conventional kind and is accordingly not shown in the drawing.

In the embodiment shown in FIG. 1, a different form of continuous premixer 50, which is commercially available under the designation "Flow Jet," is used in conjunction with a suction belt filter 51.

Gypsum plaster is fed at 11 uniformly into the mixing chamber of the premixer 50 where a continuous supply of water is added at 16 to form a uniformly mixed plaster slurry. The mixer is adapted to give a uniformly mixed slurry without causing an unacceptable degree of dispersion or break-down of the plaster particles. Moreover, the mixer has a very short residence time and thus avoids any premature hydration of plaster.

The resulting plaster slurry is allowed to flow through a chute 52 on to a horizontal low-vacuum belt filter 51. The filter consists of a continuous filter medium or belt 53 which is dragged over vacuum chambers 54 by means of drive and tension rollers 55 and 56, respectively, at linear speeds ranging, for example, from 24 to 72 ft/min. or even up to 600 ft/min. Thus the residence time of the plaster during filtration can be adjusted from less than 5 seconds to 15 seconds. The vacuum chambers 54 can be separately connected to different vacuum sources, for example a fan 57 and a vacuum pump 58 as shown, to obtain optimum filtration settings, or if required interconnected to the same vacuum source.

The filtrate which is collected in the vacuum chambers can be discharged either by gravity through a barometric leg dipping inside a seal trough 60 or by connecting the filtrate pipe to a centrifugal pump 61. The dewatered plaster sludge or cake is picked up on floating rollers 62 in contact with the filter belt 53 during its return to the slurry feed end. The cake compacts up on the rollers 62 and partially falls due to its own weight. In addition, the cake may be discharged either by means of a reciprocating cutter or doctor 63 or by the cutting action of a rotating helical screw placed close to and underneath the discharge rollers. The filter belt 53 is cleaned effectively by means of either a low pressure or a high pressure water spray 64 prior to its return to the slurry feed.

The filter cake is discharged into a further continuous mixer 65, which may be of conventional type, for adjustment of its water content to the desired value for manufacture of a set product, such as gypsum board.

The following is one example of the operation of the embodiment of FIG. 1.

Calcined gypsum plaster was fed uniformly at the rate of 475 kg/hr into the mixing zone of a "Flow Jet" mixer to which 640 liters/hr of water was continuously supplied. The slurry was fed on to the horizontal belt filter operating at a vacuum of 37–50 mm inches Hg and a residence time of 15 seconds. The calcined plaster originally contained 780 ppm $Na^+$ impurity expressed as $Na_2O$ and 320 ppm $Cl^-$ and after filtration gave a discharge cake containing 370 ppm $Na_2O$ and 200 ppm $Cl^-$ on an hydrated gypsum basis. Thus some 40%–50% of the dissolved salts were removed.

Furthermore, laboratory vacuum filtration tests have shown that by providing a single displacement wash through the cake after filtration, the soluble salt content of the cake can be reduced to 200 ppm $Na_2O$ and 50 ppm $Cl^-$ (plaster basis). Thus effectively 75% of the salts can potentially be removed by providing a single displacement wash through the cake.

I claim:

1. A method of removing salt from gypsum plaster supplied to a manufacturing process for the production of set gypsum products which comprises rapidly and continuously mixing a continuous supply of dry salt-bearing gypsum plaster with a flow of water having a temperature below the hydration transition temperature of the gypsum plaster, continuously transferring the mixture of said plaster and said water to a continuous filter thereby separating a substantial portion of the water containing dissolved salt from the plaster by continuous filtration, the time elapsing between mixing of the plaster with water and separating a substantial proportion of the water being less than 30 seconds, thereby ensuring that unacceptable hydration does not occur, and conveying the damp or wet plaster to the manufacturing process.

2. A method of removing salt from gypsum plaster supplied to a manufacturing process for the production of set gypsum products which comprises rapidly and continuously mixing a continuous supply of dry salt-bearing gypsum plaster with a flow of water having a temperature of 0° to 40° C., continuously separating a substantial portion of the water containing dissolved salt from the plaster by continuous filtration, the time elapsing between mixing of the plaster with water and separation of a substantial proportion of the water, not exceeding 30 seconds, and conveying the damp or wet plaster filter cake free from a substantial amount of salt to the manufacturing process.

3. The method of claim 2 wherein the water is at a temperature of 0° to 30° C.

4. The method of claim 2 in which the weight ratio of the flow of water to the supply of plaster is from 1:1 to 5:1.

5. The method of claim 2, wherein the filtration is effected in a period of time up to about 15 seconds.

6. The method of claim 2, wherein after filtration the damp or wet plaster filter cake is further washed with water to further remove the dissolved salts contained therein.

7. The method of claim 2, wherein up to about 50% of the salt is removed from the salt-containing gypsum plaster.

8. The method of claim 6, wherein up to about 75% of the salt is removed from the salt-containing gypsum plaster.

9. The method of claim 6, wherein the salt content of said plaster expressed as $Na_2O$ and $Cl^-$ is reduced to about 200 ppm $Na_2O$ and 50 ppm $Cl^-$.

* * * * *